(12) United States Patent
Blackmore et al.

(10) Patent No.: US 6,799,200 B1
(45) Date of Patent: Sep. 28, 2004

(54) MECHANISMS FOR EFFICIENT MESSAGE PASSING WITH COPY AVOIDANCE IN A DISTRIBUTED SYSTEM

(75) Inventors: Robert S. Blackmore, Poughkeepsie, NY (US); Chulho Kim, Poughkeepsie, NY (US); Kevin J. Gildea, Bloomington, NY (US); Rama K. Govindaraju, Poughkeepsie, NY (US); Gautam H. Shah, Fishkill, NY (US)

(73) Assignee: International Business Machines Corporaiton, Armonk, NY (US)

( * ) Notice: Subject to any disclaimer, the term of this patent is extended or adjusted under 35 U.S.C. 154(b) by 804 days.

(21) Appl. No.: 09/619,053

(22) Filed: Jul. 18, 2000

(51) Int. Cl.[7] .................. G06F 15/167; G06F 13/28
(52) U.S. Cl. .................. 709/212; 709/216; 710/22; 710/26
(58) Field of Search ................. 709/212, 216; 707/202, 205, 206, 207; 710/22, 26; 711/202, 206, 207

(56) References Cited

U.S. PATENT DOCUMENTS

| | | | |
|---|---|---|---|
| 4,910,733 A | 3/1990 | Sommani et al. | 370/85.1 |
| 4,995,056 A | 2/1991 | Fogg, Jr. et al. | 375/7 |
| 5,042,029 A | 8/1991 | Hayakawa | 370/60 |
| 5,063,562 A | 11/1991 | Barzilai et al. | 370/94.1 |
| 5,113,392 A | 5/1992 | Takiyasu et al. | 370/85.15 |
| 5,130,986 A | 7/1992 | Doshi et al. | 370/94.1 |
| 5,166,674 A | 11/1992 | Baum et al. | 340/825.07 |
| 5,193,151 A | 3/1993 | Jain | 395/200 |
| 5,265,207 A | 11/1993 | Zak et al. | 395/200 |
| 5,313,582 A | 5/1994 | Hendel et al. | 395/250 |
| 5,335,232 A | 8/1994 | Suzuki et al. | 371/20.4 |
| 5,404,478 A * | 4/1995 | Arai et al. | 711/206 |
| 5,448,561 A | 9/1995 | Kaiser et al. | 370/85.1 |
| 5,463,382 A | 10/1995 | Nikas et al. | 340/825.44 |
| 5,490,168 A | 2/1996 | Phillips et al. | 375/224 |
| 5,539,465 A | 7/1996 | Xu et al. | 348/388 |
| 5,577,211 A | 11/1996 | Annapareddy et al. | 395/200.13 |

(List continued on next page.)

OTHER PUBLICATIONS

Blumrich et al., "Virtual–memory–mapped network interfaces" Micro, IEEE, vol.: 15 Issue 1 , Feb. 1995 Page(s): 21–28.*

(List continued on next page.)

*Primary Examiner*—Marc D. Thompson
*Assistant Examiner*—Tam T. Phan
(74) *Attorney, Agent, or Firm*—Lawrence D. Cutter

(57) ABSTRACT

An efficient mechanism for sending messages without the use of intermediate copies (i.e. without the staging of data) is provided. In particular an interface specification which allows use users of a transport protocol is defined so as to lend itself to efficient implementations. The interface specification is a complete and robust set of user functions usable within systems desiring reliable and efficient zero copy transport protocols. Two methods are provided to accomplish the implementation of an efficient zero copy protocol. The first method is especially useful in systems where the network device has limited capabilities in terms of hardware, message fragmentation and message reassembly. An additional RDRAM memory allows data to reside in an adapter while handshake operations take place between an adapter and a node so as to specify the final destination of the data. The second method takes advantage of network devices with advanced features which are exploited for maximum efficiency.

4 Claims, 6 Drawing Sheets

U.S. PATENT DOCUMENTS

| | | | |
|---|---|---|---|
| 5,745,487 A | | 4/1998 | Hamaki ....................... 370/352 |
| 5,745,685 A | | 4/1998 | Kirchner et al. ........ 395/200.14 |
| 5,784,649 A | | 7/1998 | Begur et al. ................. 395/872 |
| 5,787,073 A | | 7/1998 | Ikeda .......................... 370/236 |
| 5,812,775 A | | 9/1998 | Van Seters et al. ..... 395/200.43 |
| 5,878,226 A | * | 3/1999 | Benner et al. .............. 709/233 |
| 5,923,662 A | * | 7/1999 | Stirling et al. .............. 370/432 |
| 5,936,960 A | | 8/1999 | Stewart ....................... 370/438 |
| 6,038,604 A | | 3/2000 | Bender et al. .............. 709/233 |
| 6,038,606 A | | 3/2000 | Brooks et al. .............. 709/235 |
| 6,044,079 A | | 3/2000 | Calvignac et al. .......... 370/395 |
| 6,304,951 B1 | * | 10/2001 | Mealey et al. .............. 711/206 |

OTHER PUBLICATIONS

Murayama et al. "A Study of High Performance Communication Mechanism for Multicomputer Systems" 1996, Retrieved from http://ipdps.eece.unm.edu/1996/PAPERS/S03/HMURAY/HMURAYA.PDF in Nov. 2003.*

Kontothanassis et al. "Using memory–mapped network interfaces to improve the performance of distributed shared memory" IEEE High–Performance Computer Architecture, 1996. Proceedings. Second International Symposium on , 3.*

* cited by examiner

MECHANISMS FOR EFFICIENT MESSAGE PASSING WITH COPY AVOIDANCE IN A DISTRIBUTED SYSTEM

BACKGROUND OF THE INVENTION

The present invention is directed to an efficient mechanism for message passing by avoiding the use of unnecessary message copies so as to enable zero copy transport. More particularly, the present invention is directed to the use of an interface mechanism which efficiently implements zero copy transport protocols. A protocol with two separate implementations is included which efficiently maps to two different network adapters with varying capabilities on parallel or distributed computer systems like the RS/6000 SP.

TERMINOLOGY

DMA: (Direct Memory Access): refers to a mechanism by which hardware engines (known also as DMA engines) are programmed to move data across a system without the CPU (central processing unit) being used in the movement of data. For instance, a DMA engine could be used to move data to/from system memory from/to a peripheral device such as a network adapter. This mechanism helps offload the CPU from the movement of data thus freeing it up for other work. In general, DMA refers to those techniques employed in computer systems in which certain clock cycles on the system bus are used by the memory system. This is generally known by those skilled in the art as "cycle stealing."

Zero Copy transfers: This refers to the mechanism where a user buffer is directly transported to an intended target (such as a network device or a target buffer) by eliminating the use of CPU to effect the transport. Typically zero-copy transfers use DMA engines which avoid staging the transfers through any intermediate buffers on the node. Note that zero copy transfers do not have to be symmetric with respect to the source and target buffers. For instance one could have a zero copy transfer on the source where data is moved out of a user buffer into the network while the receiver uses the CPU to stage data through intermediate buffers before moving it to the target buffer or vice versa. However, from a CPU utilization perspective, it is preferable to avoid copies both on the source and on the target.

Reliable Transport: Refers to a transport mechanism where the transport protocol guarantees that messages submitted for sending are received by the target systems transparently to the application and where recovery from transient network failures is provided (including transient network adapter failures). This is typically accomplished in the art by ensuring that every packet sent is acknowledged by the receiver, and the sender retransmit the packet if an acknowledgment is not received in a well defined interval of time. The interval of time is a function of the efficiency parameters of the system (node, processor, network, etc.) and is known as the retransmit timer interval.

Pinning Buffers: In virtual memory systems, the operating system is able to change the physical location of a buffer (especially if it is moved out to disk and moved back to memory). DMA engines typically work using physical/real addresses. In order to ensure that the physical addresses do not change (for instance to ensure that DMA engines refer to the same logical buffer intended by the initiation of the DMA operation) operating systems provide "pinning" services to ensure that physical pages corresponding to the buffers in consideration are marked as non-pageable and thus to maintain the same real memory addresses until the buffer is unpinned.

Mapping Buffers: This operation refers to the establishment of mapping host buffers for use by a DMA engine. The operation typically consists of loading physical addresses corresponding to buffers in consideration onto a network device so that the network device may move incoming data associated with the buffers directly into and out of the physical memory addresses specified by the address map.

Posting Buffers: This operation is used to make an association between a communication layer tag and the underlying and a user buffer (which has been mapped). The tag is usable by any entity (for instance the network adapter) to determine the buffer into which an incoming message should be moved. Note that the mapping operation is a purely local operation and determines how a user buffer is accessed by a DMA engine. The post operation assumes that the communicating agents have agreed to use a specific tag value to refer to a specific user buffer.

Parallel and Distributed computer systems are becoming increasingly powerful in terms of rapid increases in the speed of each CPU (along with number of CPUs on each node), and the speed of the network which interconnects the various nodes on the system. However the memory bandwidth (the rate at which the CPU can move data from one location in memory to another) has not kept pace with the improvements in CPU and interconnect speeds. The protocol overhead in moving data from one node to another node in the system is therefore increasingly dominated by the CPU copy cost of moving data (typically from a user buffer into a pre-pinned and pre-mapped network buffer which is used in a FIFO (First In First Out) fashion). This is becoming especially true since as the size of databases and file systems has increased considerably causing the size of data blocks which need to be transported to also increase. It is therefore highly desirable for continued scaling of capacity in such systems to ensure that CPU overhead in the movement of data is eliminated. Offloading the CPU from data movement allows the CPU to be freed up to process other workloads and thereby increases the capacity of the entire system.

The present invention is employable in to any circumstance that involves data transport which can be offloaded. Further the source and target systems do not have to be symmetric (for instance the source can be a compute node and the target could be a storage node). Additionally the present invention supports asymmetric zero copy transfers. For instance one could employ zero copy transfer on the source, where data is moved out of a user buffer into the network, while the receiver uses the CPU to stage data through intermediate buffers before moving it to the target buffer or vice versa. However, it is preferable to employ zero copy transfer on both the source and target systems.

SUMMARY OF THE INVENTION

Copy overhead is eliminated in the present invention through the use of a reliable copy-avoiding message passing protocol. Support for copy avoidance includes active messages [U.S. Pat. No. 6,038,604], where the target memory is not known. Communication software is invoked so that the CPU is not engaged in staging the message through intermediate buffers in the communication software. The interfaces of the present invention allow the user to prepare (pin and map) the source/target buffer and enable the network device (adapter) to DMA (direct memory access) directly from the user buffer into the network. On the target/receiving side, the receiver posts user buffers to the network device so as to allow the network device to transfer, via a DMA mechanism, incoming data directly into the user target buffer. Matching of incoming messages to the appropriate buffer is done based on an algorithmically generated unique tag returned by the post. The posted tag has to be unique to ensure that the incoming data is moved to the intended target buffer. In order to make certain that the tags are unique, the communication software algorithmically generates tags that depend on message number, the source of the message, the packet within the message and an index where the buffer mapping is found. Note that the posting of the buffer may architecturally occur before the arrival of a message into the network device or after the arrival of message into the network device. However from an implementation standpoint, whether posting is done before or after message arrival depends on the adapter design. The present communication protocols address both these scenarios. Reliability of the transfer through an acknowledgment based flow control and retransmit mechanism is also provided and further includes several safety mechanisms to ensure that state maintenance required to accomplish a reliable zero copy transport is efficient.

In the present invention there are two implementations both of which enable efficient zero copy transfer of messages from the memory of one machine into the memory of another machine. These mechanisms include (a) establishment of an association between the user buffer and an algorithmically generated unique tag name on the network device for matching purposes, (b) management of message fragmentation at the source, (c) transport of the message, and (d) reassembly of the message at the target in network memory without staging through an intermediate host buffer.

Another key aspect of the present invention is that communication is performed in a reliable fashion over a possibly unreliable network via an acknowledgment/retransmit protocol (i.e. messages submitted to be transferred are guaranteed to reach the target even in the presence of transient network failures (adapter or switch interconnect) as long as the source/target do not fail and there is some communication path available between the corresponding network devices).

This aspect of the present invention is more particularly illustrated in patent application Ser. No. (PO-9-2000-0116) which is being submitted concurrently with the present application and which is assigned to the same assignee as the present invention.

Also, the present invention offers the choice of indicating if the buffer preparation/setup (pinning and mapping) is static or dynamic. It allows implementations to offer appropriate services based on user requirements. The choice of static vs. dynamic depends on multiple factors such as the size of the buffer, available resources to prepare the buffer, the time period the buffer is to be held, the "cost" of preparing the buffer each time as compared to the "cost" of preparing the buffer just once (and also as compared to the "cost" of copying with respect to the cost of preparing the buffer). The "cost" of preparing a buffer for zero copy transfer includes the cost of pinning the buffer and mapping its corresponding translation table onto a network device.

Accordingly, it is an object of the present invention to define an interface architecture that lends itself to efficient zero copy transport implementation.

It is a further object of this invention to provide a method for transmitting data directly from an address space of one process into the address space of another process via direct memory access and with zero copy transfer.

It is a further object of the present invention to ensure extremely rapid data transfer rates between systems.

It is also an object of the present invention to ensure that any and all direct memory access occurring from a different system occurs correctly without corrupting data.

It is also an object of the present invention to provide a mechanism to algorithmically generate a unique tag to be associated with the physical page addresses that constitute the buffer.

It is still a further object of the present invention to ensure address space integrity in a receiving data processing system by ensuring that a unique tag is matched with the posted setup before any data is transferred into user memory It is yet another object of the present invention to take full advantage of direct memory access procedures and techniques available on network adapters.

It is also an object of the present invention to ensure that data is not transmitted from one system to another without the second system being fully prepared for its receipt and in particular fully prepared for DMA operations to users' buffers.

It is still a further object of the present invention to enable users running applications in their own address spaces on one data processing system to be able to transfer data accurately and efficiently into a user's address space in another data processing system whether or not that data processing system is remote or in fact contained within the same physical package or frame.

It is also an object of the present invention to facilitate the protocol that it known as reliable zero copy transport.

It is yet another object of the present invention to ensure that network device memory is efficiently used and that data structures exist and are organized to minimize the code and data footprint used on network devices.

It is yet another object of the present invention to the ensure that the tag table stored on a network adapter memory is never overrun and flow control is managed to guarantee progress without deadlocking.

It is yet another object of the present invention to ensure that zero copy protocol provides hooks for the application are notified on completion of communication events via the use of callback functions.

It is yet another object of the present invention to ensure that the zero copy protocol provides for both pull and push models of communication.

It is yet another object of the present invention to minimize control traffic across nodes employing zero copy transfers when there is special hardware on the network device.

It is yet another object of the present invention to allow dynamic pinning and mapping of user buffers based on when they are to be used for transport so as to ensure that the amount of memory pinned at any given time is small, if not even minimal.

It is yet another object of the present invention to ensure that the CPU utilization for protocol processing to effect data transfer is minimized so that the CPU can be freed up to do other work.

It is yet another object of this invention to ensure that communication bandwidth is effectively utilized.

Lastly, but not limited hereto, it is an object of the present invention to establish a data communication protocol that takes full advantage of direct memory access capabilities.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
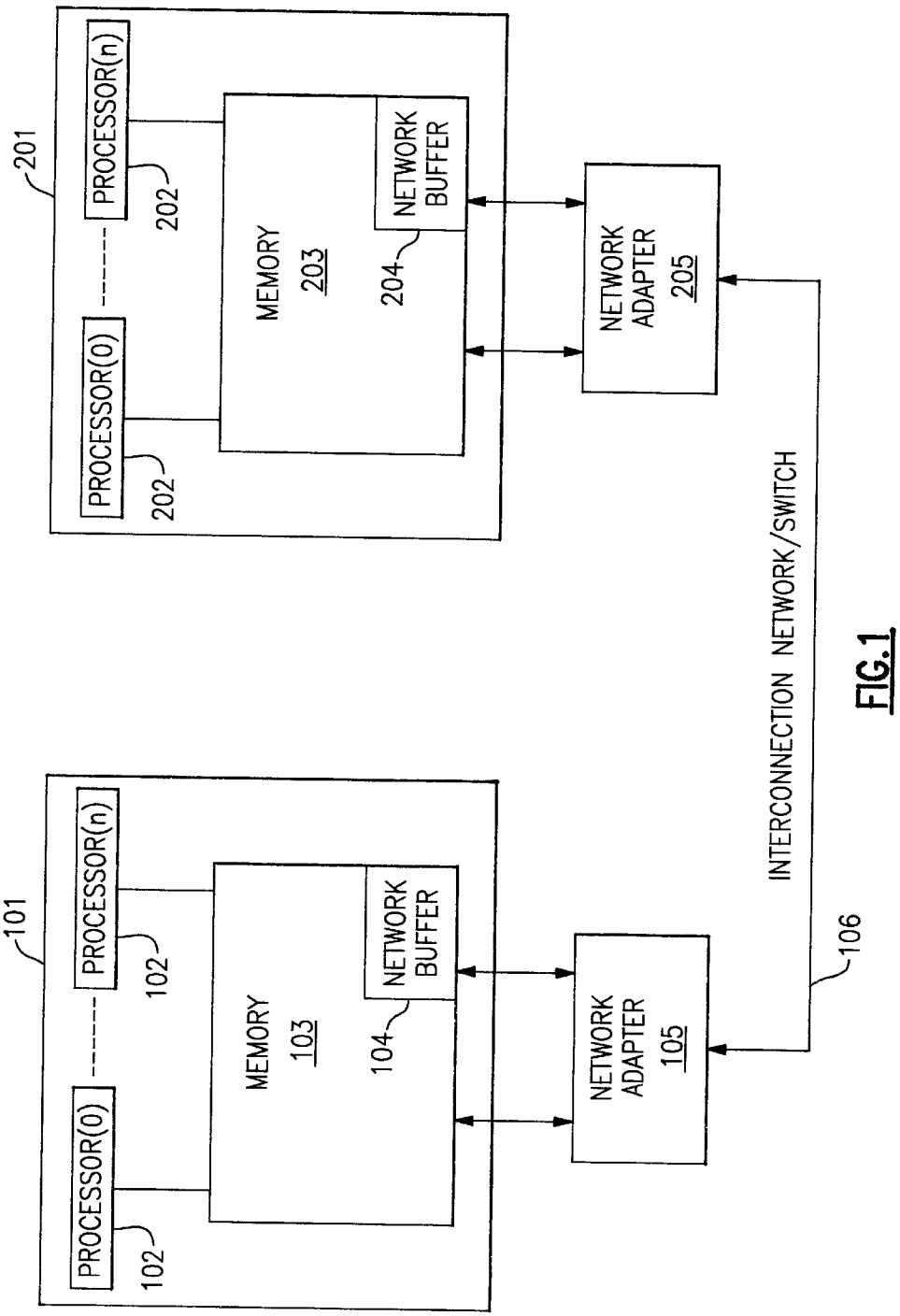
FIG. 1 is a block diagram illustrating key hardware components in a parallel distributed computer system.

The present invention is be appreciated in its various embodiments by first considering a communications protocol which allows the efficient implementation of several methods of zero copy y data transfer, two of which are more specifically described below.

Protocol for Zero Copy Transport

1) The user prepares the send and receive buffers for use by the DMA engines. Note that if the buffers are to be reused, they do not have to be prepared again (if their DMA preparation has not been invalidated by the user). It is possible that the buffer cannot be prepared because of hardware implementation restrictions. In such cases preparation fails and it is the user's responsibility to invoke other (non-zero copy) mechanisms.

2) A logical tag is associated with this buffer. This tag is a mutually agreed upon value between the sender and the receiver for this message (for instance it can be generated by the receiver and communicated to the sender; or it can be coordinated by other means including possibly static assignment).

3) The prepared buffer is posted to the communication layer. Note that although architecturally it is possible to delay this step until the message associated with this tag actually arrives, because of the active message interface, from an implementation and a performance standpoint it is preferable to post the buffer before the message arrives.

4) The user issues a send operation that specifies the send buffer from which data is to be moved out, the mutually agreed upon tag that provides a mapping to the receive buffer at the target and a handler that is invocable to determine the receive buffer on the target, in addition to the other parameters of a send operation. Alternatively the user can issue a "get" operation.

5) If a buffer associated with a tag specified in an incoming zero copy packet is not posted, the header handler is invoked to give the user an opportunity to post the buffer. However as indicated earlier, this is not the preferred approach because of performance implications and is limited in some implementations.

6) The user is notified (if requested) on completion of the send operation at the source. Similarly if the user has requested notification on the target, a user specified callback is invoked at the completion of message arrival on the target. On such notification, the user can choose to tear down the previously setup buffer mapping of the source/target buffers.

An example API which instantiates the protocol above is given below. This API shows the basic features of the protocol but it is noted that many variations are possible.

The Interface Specification to Enable Efficient Zero Copy Transport

The interfaces that are specific to the zero copy transport are specifically included herein. Further the interfaces described herein reflect the major aspects relevant to the zero copy transport; other details not relevant to the zero copy aspect of the API are not included in the description.

The interface includes mechanisms for preparing a buffer (DMA_Setup), tearing down a prepared buffer (DMA_Cleanup), Posting a buffer to the network device (Post_Buffer), Cancelling a previously posted buffer (Cancel_Post_Buffer), a send operation (Send_Buffer) and get operation (Get_Buffer).

1. Function to post a receive buffer: Post_Buffer
Purpose: Post a receive buffer on the communication device for DMA of an expected zero copy message.
int PostBuffer(struct xmem *dp, uint len, int tag);
Parameters
dp—describes the buffer into which data is expected to be DMA'ed
len—The length of the expected message (in bytes).
tag—The tag used to match the buffer with incoming lapi message.
Description
Post_Buffer specifies a buffer to be used by communication device to DMA an expected message. It is assumed that this buffer has already been prepared for DMA using DMA_Setup. If the incoming message uses "tag" as the tag, it will match this posted buffer and the data portion of the matched message is DMA'ed into the buffer specified by dp. The tag value used in this call is the same value that should be used by a sender in Send_Buffer in order to match this buffer.

If a buffer with previously specified and still unmatched tag is specified, it overrides the specification of the previous tag. If the same buffer is specified with different tag, the new tag is posted and each tag match results in a distinct DMA operation. Therefore it is the user's responsibility to manage the tag space.

2. Function to cancel a posted receive buffer: Cancel_Post_Buffer
Purpose
Cancel the posting of a direct-DMA buffer.
int Cancel_Post_Buffer(int tag)
Parameters
tag—The previously provided tag to match the buffer which is being cancelled.
Description
Cancel_Post_Buffer cancels a direct-DMA buffer that was previously posted with tag "tag". If a buffer with tag has not been previously posted, no action is taken and an error is returned. Once a posted buffer tag has been cancelled, incoming messages using this tag will not find a DMA buffer (unless a buffer with this tag is posted again). Note that until the cancel completes the contents of the buffer associated with tag could be modified (if incoming messages match the tag).

3. Function to map user buffer for direct-DMA use: Dma_Setup

Purpose

To set up the buffer mapping for DMA use int Dma_setup(void *bufp, uint len, struct xmem *dp)

Parameters bufp—Virtual address of the buffer to be mapped for DMA use len—The number of bytes starting from bufp that should be provided DMA addressability dp—The cross memory descriptor of the buffer Description This function is used to set up the DMA addressability of a buffer specified through the cross memory descriptor dp. It is assumed that the user has previously pinned the buffer and attached the buffers. This allows the user to decouple mapping from having to post a buffer for receiving data.

4: Function to unmap user buffer for direct-DMA space:Dma_cleanup Function

Purpose: clean up the DMA mappings associated with the specified user buffer which were previously setup using DMA_Setup int DMA_cleanup(struct xmem *dp);

Parameters dp—cross memory descriptor (passed in to DMA_Setup) of the buffer whose mappings associated with the adapter can be tore down.

Description

DMA_Cleanup tears down the mappings associated with the buffer described through the cross memory descriptor dp on the communication device.

5. Function to Send an Active Message in Zero Copy Mode: Zero_Copy_Send

Purpose

To send a message using direct-DMA to a remote (target) process and then invoke a user provided Active Message (AM) handler to run on the remote process.

typedef void (*completion_hndl_t)(void *completion_param);

typedef (void *) (*post_hdr_hndlr_t)(void *uhdr, uint uhdr_len, uint *msg_len, completion_hndl_t comp_h, void **uinfo);

int Zero_Copy_Send(uint tgt, void *phdr_hndlr, void *uhdr, uint uhdr_len, struct xmem *dp, uint len, int ptag, phys_addr_t tgt_dma_addr)

Parameters:

tgt—The target process number phdr_hndlr—A pointer to the header handler function to be invoked at the target on arrival of the message uhdr—A pointer to the header (in kernel name space). The contents of uhdr will be passed to the phdr_hndlr on the tgt.

uhdr_len—The length of the header (it is limited to some maximum value specified by the implementation dp—cross memory descriptor of data to be sent len—length of the user data (number of bytes to be DMA'ed)

ptag—The tag to be used for locating the matching DMA buffer on tgt tgt_dma_addr—The address of the memory on the target into which this message is to be DMA'ed. (Used with some special ptag values)

Description

This function transfers phdr_hndlr function pointer along with the contents of header and data (specified by the cross memory descriptor) from the origin to the target process tgt. The data portion will be attempted to transfer without using a CPU copy. When the message arrives at the target process, the header-handler phdr_hdl is invoked at the tgt target with the pointer to uhdr as one of the parameters. The header handler can get called under 2 different scenarios. One scenario is that a receive buffer has not been posted for an incoming message. In this case the header handler returns a cross memory descriptor associated with a buffer where the user wants the data moved. It is assumed that this buffer has already been setup for DMA use using DMA_setup.

The other situation when a header handler can get invoked is when a Post_Buffer was already done and the incoming message has been DMA'ed. In this case the header handler returns null. The users header-handler is expected to save any information that will be:required later by the completion-handler. The header-handler also returns (through reference parameters) the completion-handler and a pointer to the saved information. Note that the header-handler should be non-blocking because no progress on the messages associated with hndl can be made until control is returned to the communications library from the header-handler.

After the header-handler returns, data (if required) is DMA'ed into the user posted buffer. When all of the data has been DMA'ed into the user specified buffer, the completion-handler returned by the user through the post-header-handler is invoked.

After the parameters (including contents of header and data) are DMA'ed out of the memory at the origin, org_cntr is incremented. After the completion-handler has completed execution at the tgt, tgt_cntr is incremented. If the completion handler specified is a NULL, then tgt_cntr is incremented after all the data has been DMA'ed into the appropriate buffers. The counter addresses may be NULL which implies that the corresponding counter is ignored.

This is a non blocking call. The calling process may not change the origin header uhdr and data udata until completion at the origin is signaled by the org_cntr being incremented. Similarly, the specified AM handler hdr_hdl is assumed to have executed at tgt only after the target counter tgt_cntr has been incremented. The cmpl_cntr is incremented at the origin after the data has been moved to the specified target location and after the associated completion handler (if any) has finished execution.

6: Function: Get_Buffer

Purpose

To get a message using direct-DMA from a remote target and optionally run a completion handler when the data transfer is complete.

typedef void (*completion_hndl_t)(void *completion_param);

int Get_Buffer(uint tgt, unit len, struct xmem *tgt_dp, void *tgt_addr, struct xmem *org_dp, void *org_addr, int ptag, compl_hndlr_t *shdlr, void *sinfo)

Parameters tgt—The target switch node number len—Length of the user data tgt_dp—Cross memory descriptor of data to get tgt_addr—Address of the user data to get org_dp—Cross memory descriptor of location to store the data org_addr—Address of the location to store the data ptag—The tag to be used for locating the matching DMA buffer on the target shdlr—Send completion handler. User function to be called with the send has completed
sinfo—Pointer to data used by the send completion handler.
Description Use this subroutine to transfers len number of bytes from tgt_addr address at the target process to the org_addr virtual address at the origin process over the port identified by hndl. It is assumed that the target buffer has already been set up for DMA use with a call to DMA_Setup This is a non blocking call in that the calling program (all processes associated with the program including the local and remote processes involved) can not assume that the target buffer can be changed, nor that contents of the memory pointed to by org_addr on the origin is ready for use. The completion of the get can be signaled by completion invoking a completion handler. The address of the completion handler is given by the shdlr argument. Its corresponding data is given by the sinfo pointer. If shdlr is NULL, no completion handler is called.

Two algorithmic methods of implementing the preceding protocol are employed in the present invention:
Methods for Zero Copy Transport

Method #1

1) A post operation by the user is translated to a post operation on the network device if acceptable. Otherwise the protocol layer needs to breakdown the post operation into acceptable units to the network device. In the case that the protocol breaks the post operation into smaller units, it ensures that the tags it generates for the network device are unique. The protocol handles the implementation limitation on the length of buffer that is posted as well as the number of buffers that are posted on the network device. Note that, because of hardware limitations, a post operation onto the network device may fail. In such circumstances, the protocol reverts to using a non-zero-copy transport mechanism in order to make message progress.

2) In order to support the "get" operation, the protocol does an implicit post before sending out the request to get. The get request includes a protocol generated unique tag. The response to the get operation is very similar to the user initiated send operation.

3) On a send operation initiated by the sender, the protocol uses the maximum packet size supported by the network device. Further the protocol paces the number of buffers it posts. This operation has different implementations based on specific hardware characteristics.

4) In one implementation (specifically on the TB3MX adapter, a unit supplied by the assignee herein), the protocol sends a control message (rendezvous request) to the target to initiate the post to the network device. The response to this message indicates if a zero-copy send should be initiated. If a zero-copy command is to be initiated, a base value of a tag is provided by the receiver. This base value is modified in well-defined manner by the sender so that multiple packets can be sent using the same base value of the tag and be assured that there are buffers posted for those values. The number of buffers posted at any instant is the function of the message length as well as a tuning parameter designed to keep the pipeline full. As acknowledgments are received by the sender additional packets if necessary are sent by computing appropriate tag values.

5) The communication protocol on the send side has to break the message into packets of granularity acceptable to the network device. In such cases, the protocol has to generate tags for the lowest layer corresponding to the tag being posted by the protocol at the receiving end. The protocol uses fields such as "message id" and "buffer index" to generate the tag to ensure its uniqueness. It should be noted that the DMA packet is a logical packet and may be further broken down into subpackets when it is transferred over the network.

6) Even if the user tears down a buffer previously prepared for DMA, the protocol may still cache information so that a subsequent preparation of this buffer is speeded up. It is the responsibility of the software protocol to ensure reliable delivery of the message. Guaranteeing reliable delivery means that communication software/network device interfaces should detect errors, recover from them and avoid memory corruption. Note that although the current implementation assumes symmetry of zero copy on the send as well as receive side, the present invention applies to the asymmetric case as well.

Method #2

1) Identical to Method #1

2) Identical to Method #1

3) In one implementation (using a more advanced adapter with its own memory and processing functions included), the protocol directly sends the zero copy message (split into packets if required) to the target. In this case after message arrival and reassembly in the network device, the protocol on the receiving node is notified of the availability of this packet. At that point the protocol posts a buffer to the network device. The protocol is again notified on completion of the move from the network device into the specified receive buffer. The sender sends only a fixed number of such zero copy packets to a target in order to minimize the chances of overflowing the memory on the network device. Only after acknowledgments are received for these packets are additional zero copy packets sent.

4) Identical to Method #1

5) Identical to Method #1

6) Identical to Method #1

These two implementation methods are identical except for step number 3. In either case, the network device moves the data directly into the buffer associated with the tag. After the data is moved, the device moves the header into the network receive buffer. This header is used by the protocol as an indication that the data transfer is complete.

The essential idea is that each DMA packet is referenced by a unique tag. This tag is used as a handle such that the software is able to uniquely identify the packet and to have it DMA'ed to an arbitrary location in memory. The methods above are examples of efficient ways that such a zero copy transport is implemented.

There are several situations that arise in such mechanisms that are handled efficiently in the present invention. In particular, the flow control for the tag table on the network adapter is managed by the protocol. The retransmit protocol ensures "only once delivery" of messages (or packets of the message). A dummy page is used to as a debugging tool to ensure cancelled or duplicate zero-copy-packets do not cause data corruption. A special get function is used to avoid extra rendezvous control messages. Internal rendezvous protocols are used to help prepare the target for zero copy transfer. Additionally, there is provided a falling back from zero copy to single copy transfer in cases where the zero copy tables are clogged. Basically, there are two times that a nonzero-copy message is used as a fall-back method. In the rendezvous response, a message is returned that zero copy cannot be done. This only occurs when using the TB3MX adapter model. If the real addresses cannot be translated on the send size, a nonzero-copy message is sent. In each of these cases, a flag in the message header indicates that the message is a cancelled zero-copy message. Lastly, the present invention is also beneficial in that it permits the efficient caching of the translations tables.

FIG. 1 illustrates a block diagram showing the key hardware components in a parallel/distributed computer system which includes nodes 101 and 201 in the system. Nodes 101 and 201 include processors 102 and 202 on each node of the system respectively. These processors share memory units 103 and 203 respectively. More nodes than this are typically present but the present invention is illustrated herein using two nodes. Part of each memory 103 and 203 is mapped to the network device (as shown by network buffers 104 and 204). The nodes are connected to each other via interconnection network/switch 106 and the nodes are interfaced to the switch via network adapters 105 and 205, respectively.

Figure 2:
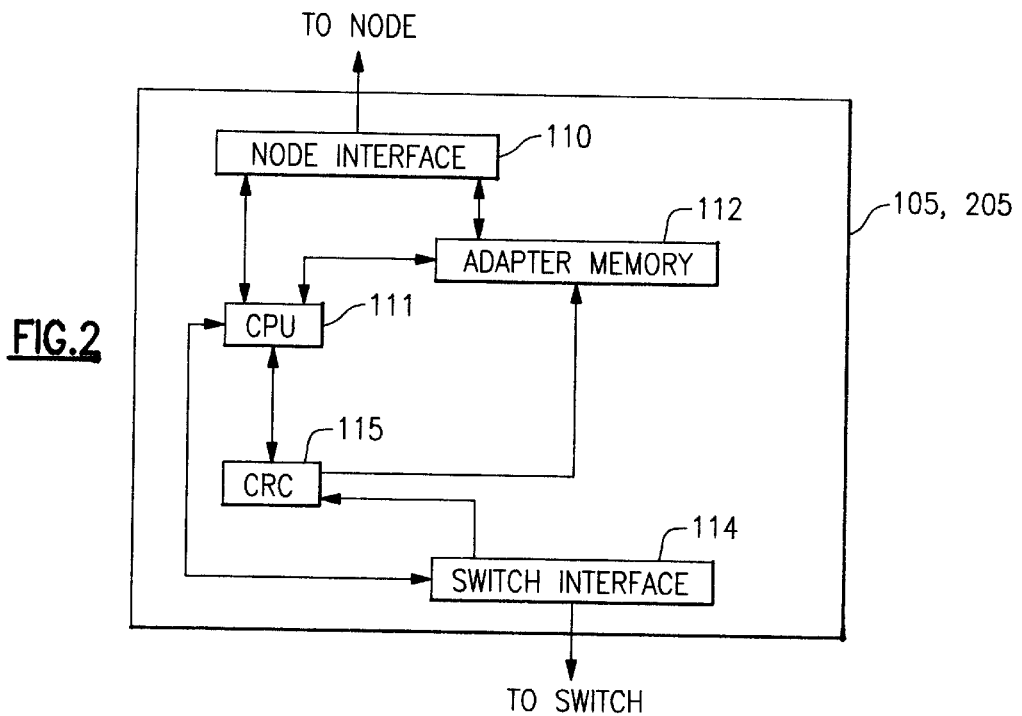
FIG. 2 is a block diagram illustrating the key components of a typical network device.

FIG. 2 illustrates, in block diagram form, the key components of a typical Network Adapter (105 or 205). Adapter 105 or 205 includes node interface 110 which allows the network device to interface with the host/node. Adapter 105 or 205 also includes processor 111. Code running on processor 111 (also sometimes referred to as microcode) handshakes with protocol code running on node processor 102 or 202 to exchange packets between the adapter and the node. The protocol on the node running on one of the processors 102 interacts/handshakes with the microcode running on network device processor 111 to program the DMA engines to move data between the node and the network device. Adapter memory 112 is where all of the microcode software structures and the microcode are stored. All of the tag tables described herein are stored in adapter memory 112 (as a result of the mapping operation which places the physical addresses corresponding to message buffers on to the adapter memory 112). In typical versions of network device 105 or 205, DMA engines 113 are programmed by the adapter microcode to effect movement of data both between the node and the network device (adapter) and between adapter 105 or 205 and switch 106. Switch interface 114 allows switch/interconnection 106 to attach to the network device and is used for both injecting packets into switch 106 from the network device 105 or 205 and for receiving packets from switch 106 into network device 105 or 205. The network device also typically has a CRC (Cyclic Redundancy Checker) 115 check in hardware to ensure that packets are not corrupted in the switch. Packets corrupted in the switch are discarded by CRC 115. An example network device of this kind is the IBM RS/6000 SP supported TB3MX adapter which attaches to the RS/6000 SP Switch 1.

Figure 3:
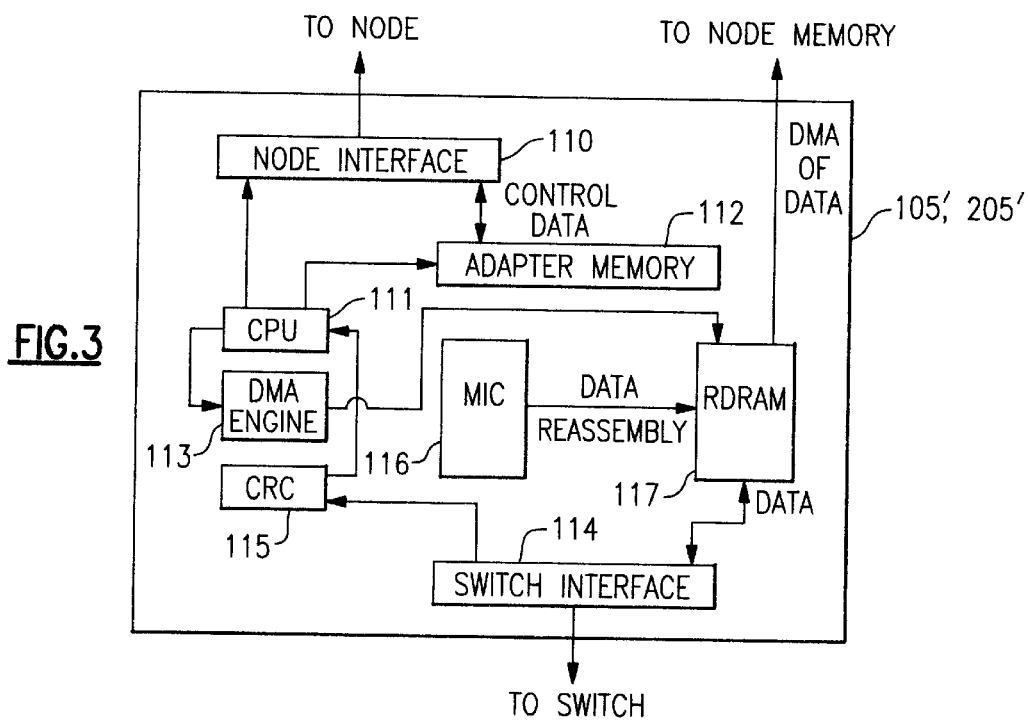
FIG. 3 is a block diagram illustrating an enhanced network device.

FIG. 3 illustrates, in block diagram form, enhanced network device 105', or 205', which is an improved variation of network device 105 or 205 shown in FIG. 2. Adapter 105' or 205' has special memory 117 (which is called RDRAM or Rambus DRAM) and MIC (Memory Interface Controller) 116. RDRAM/MIC permits hardware fragmentation and reassembly of large packets. As an example if the packet size over the switch is a 1K byte unit, RDRAM/MIC assists in hardware fragmentation and reassembly of up to 64K byte chunks). Method 2 of the zero copy protocol exploits this additional hardware to send larger chunks and to avoid the extra roundtrip handshake necessary to ensure that the zero copy setup is correctly arranged on both ends. An example of this kind of network device is IBM's Colony adapter which attaches to the RS/6000 SP Switch 2.

Figure 4:
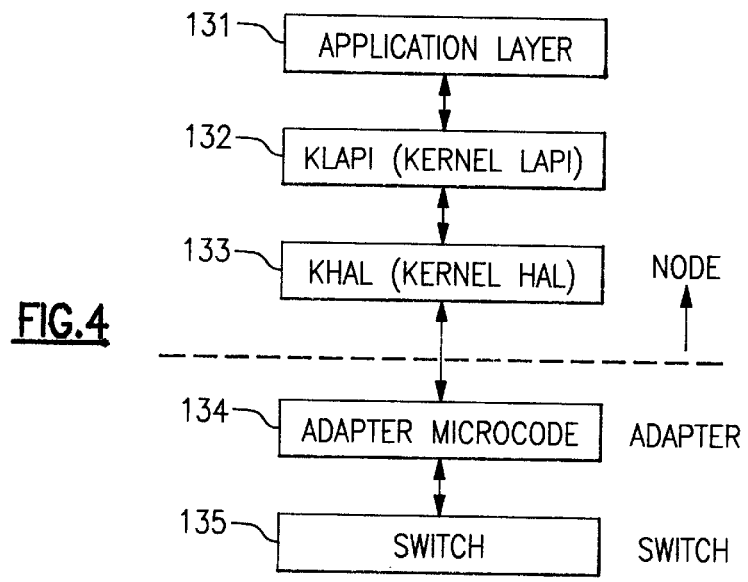
FIG. 4 illustrates the layering of software components as used in conjunction with zero copy transport protocols.

FIG. 4 shows the layering of software components involved in a zero copy transport protocol as described herein. Application layer 131 makes calls to the KLAPI (Kernel Low level Application Program Interface) subsystem 132 which provides reliable zero copy transport. The protocol state indicators used to ensure reliability is maintained in this layer. The flow control is also managed at this layer. Any lost zero copy packets are retransmitted by this layer. The KLAPI layer makes use of KHAL (Kernel Hardware Abstraction Layer) 133 which provides the packet interface. KHAL is stateless with respect to the protocol and is unreliable by definition. KHAL in turn handshakes with adapter microcode 134 to exchange packets between the protocol and the adapter and enables the handshaking between adapter microcode 134 and the protocol to ensure that accurate exchange of data occurs and that the layers are appropriately notified of the completion of communication events. Adapter microcode 134 injects packets into the network from the node and DMAs packets from network switch 135 into the node based on the addresses in the tag table. Handshake information is exchanged between the nodes and the adapter via network buffer 104.

Figure 5:
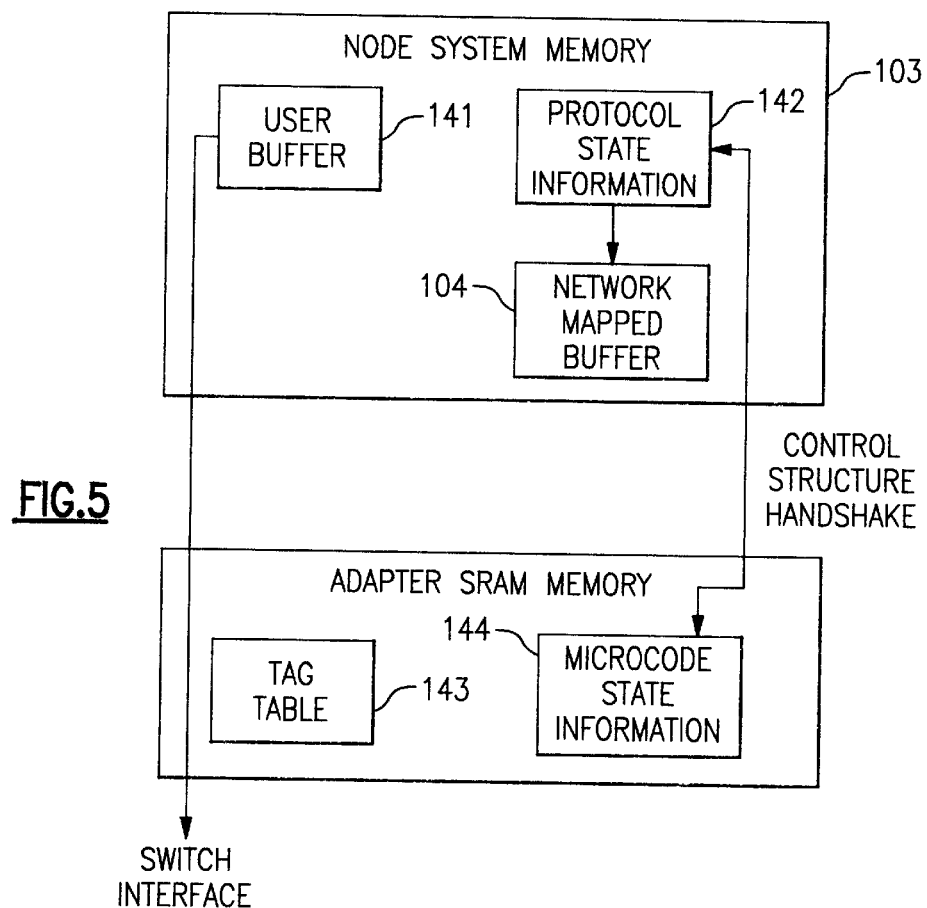
FIG. 5 illustrates key data structures which indicate how data is transported from a sender to a receiver without the use of intermediate copies.
Figure 6:
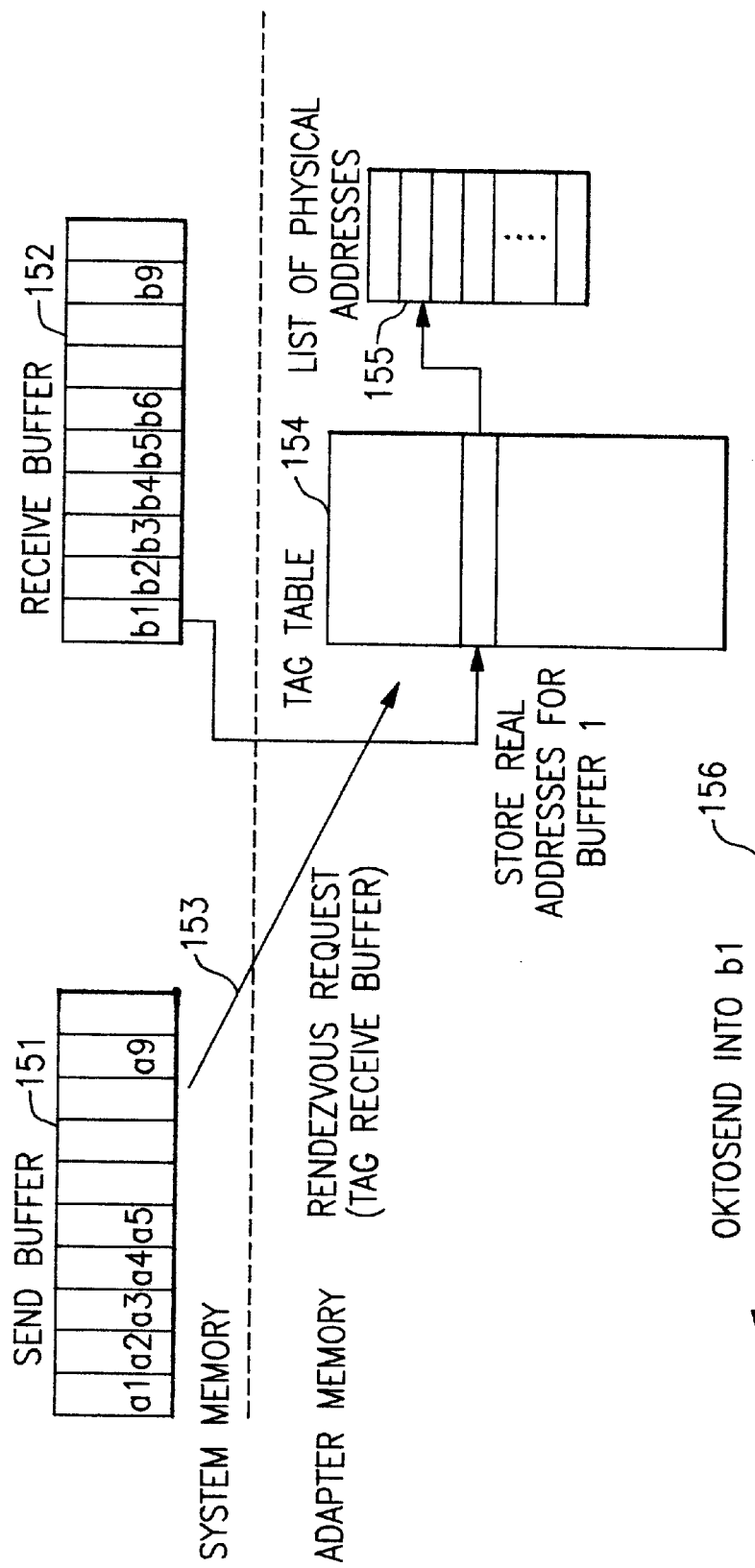
FIGS. 6 and 6A illustrate details of the zero copy protocol method.
Figure 7:
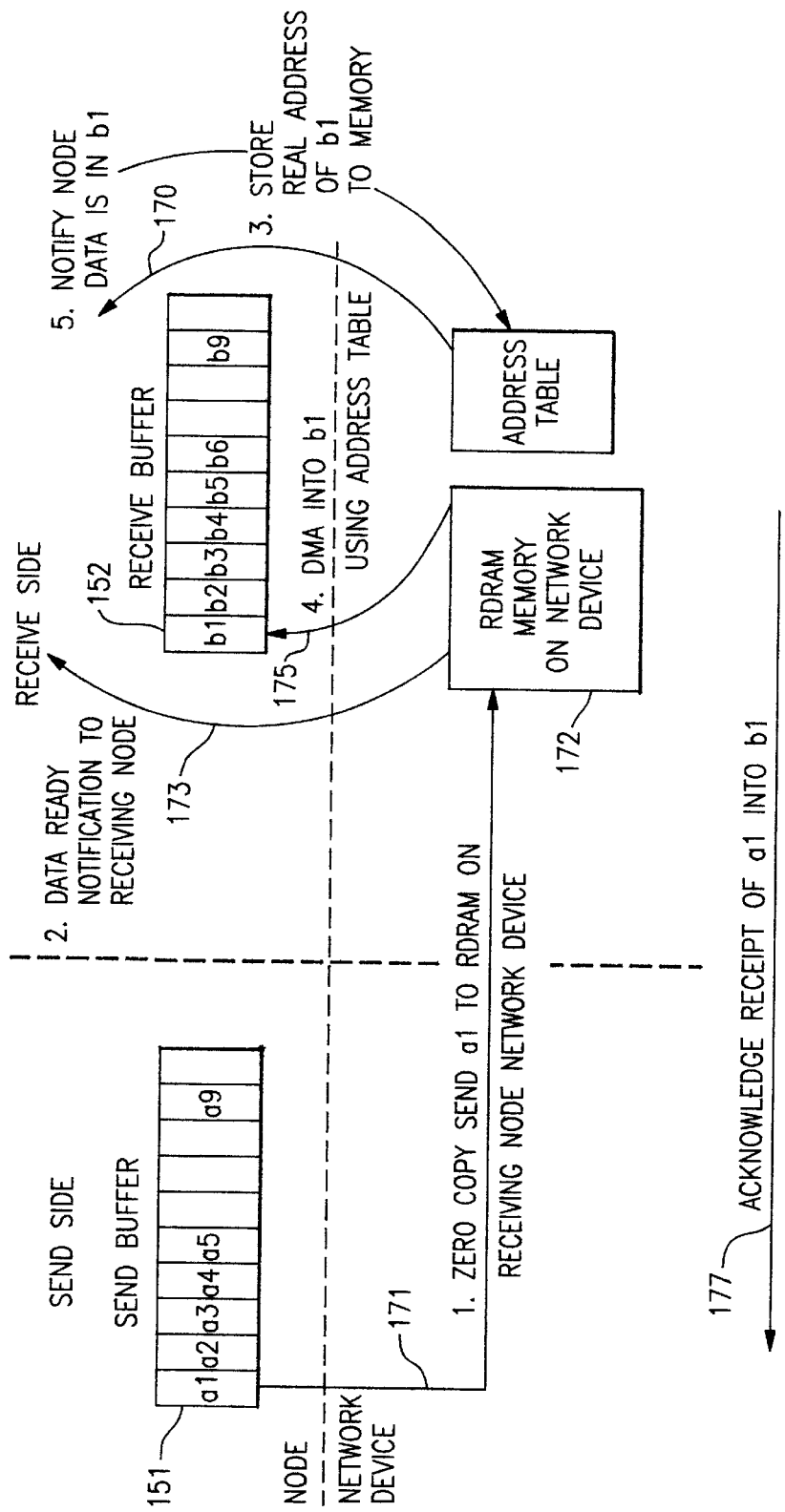
FIG. 7 illustrates details of a zero copy protocol method which specifically exploits network devices which include memory and code which facilitates zero copy transmission.

FIG. 5 depicts the key software data structures and their relations in order to show how data is transported from the sender to the receiver without any intermediate copies and the data structures that are needed for state maintenance to affect the transfer. The data structures are shown only for one node but the same data structures are available on both the sending and receiving nodes. On the sending side, User Buffer 141 from which data is to be sent is logically partitioned into superpackets (zero copy packets) as is shown in FIG. 6 and FIG. 7 and each superpacket is mapped onto the tag table in the adapter memory. The DMA engines on the adapter are then programmed to DMA the superpackets from User Buffer 141 into the network. On the receive side, the reverse happens. Tag Table 143 is used to DMA the super packet into buffer locations specified by the entries in Tag Table 143 for the tag with which the superpacket was sent. The control information regarding tags and the real address tables associated with the super packet buffer are exchanged by the protocol on the node and the adapter microcode via the network buffer 104. Data structures 142 and 144 maintain protocol state information on the node and the adapter respectively.

Figure 6A:
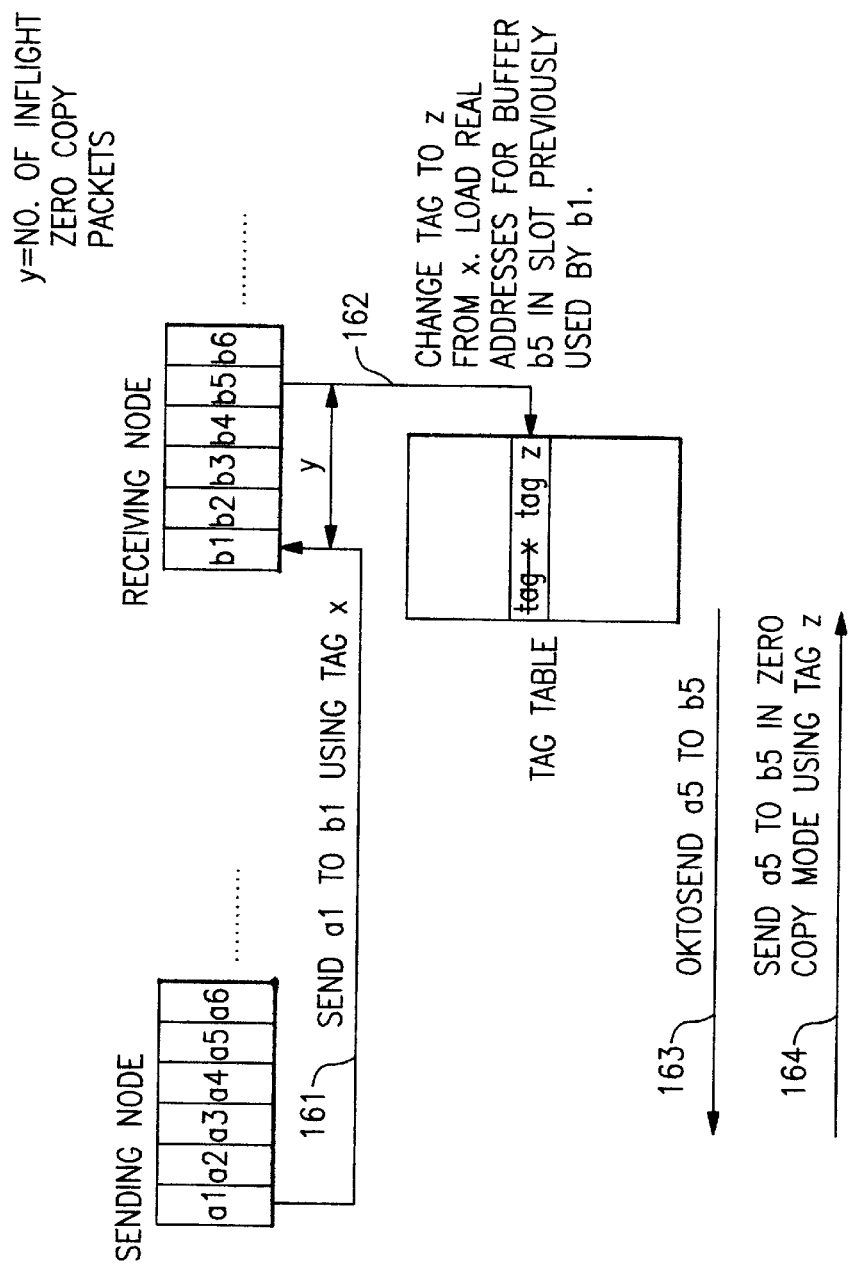

FIGS. 6 and 6a show details of how Method 1 for the Zero Copy protocol is implemented. It illustrates how Tag Table 154 which resides in limited adapter memory space is managed and efficiently used to ensure uninterrupted flow of zero copy message transfers. In the example shown in FIG. 6, send buffer 151 on the send node is composed of 10 superpackets each of which is to be transferred with zero copies into receive buffer 152 on the receiving node. The sending side first sends a header message 153 (also referred to as control message for rendezvous request message) to the receiving node. The receiving node sets up the tag table on the adapter with the real addresses of the receiving buffer 152. In the current implementation four entries in the tag table are set aside for superpackets at any given instance of time for this message. This is a tunable number and may be changed to ensure that the data pipeline is full. If setting up the tag table fails, the receiving side sends a "Send_normal" response (which implies that the receiver is not accepting the zero copy request and in this case the sender will transmit the packets using other mechanisms), otherwise the receiving side sends an "OktoSend" control message 156 back to the sending side for the first four superpackets. If the sending side is able to map the send buffer, it sends the first four superpackets (reference numeral 161 in FIG. 6A), otherwise the message is sent as a nonzero-copy message. Once a1 has been received by the receiving side into b1, the receiving side replaces the tag and the real address entries of b1 with the tag and real address entries of b5 (step 162) (so that b5 can now be received in zero copy mode). An ack (acknowledgment) is sent by the receiving side for a1 (step 163) which is a signal to the sending side that a5 can now be sent. The sending side sends a5 (step 164). The number of superpackets shown is used only as an example and is generally set based on tuning, to ensure that the pipeline of data flowing is full (i.e., a5 can start on its way before a4 has completely been received). The algorithm guarantees that the receive side setup is available before a superpacket is sent by the sending side. The algorithm also ensures that the tag table is never overrun and that zero copy messages are always sent to the correct locations in memory.

FIG. 7 shows details of how Method #2 for a Zero Copy protocol is implemented. This algorithm exploits the additional hardware (RDRAM/MIC) that is available on newer network devices as shown in FIG. 3. The sending side sends a1 ... ak in zero copy mode to the receiving side (step 171). The number, k, of superpackets sent is a function of network parameters designed and tuned to ensure that the switch is not saturated and that the receiving side RDRAM (in all probability) has space to hold the k superpackets. "k" is also referred to in the state of the art as "the number of in-flight packets." The zero copy superpackets are assembled in RDRAM 117 (step 172) on network device 205 on the receiving side. The microcode on the receiving side notifies the protocol on the node (step 173) thlt the data in RDRAM is ready. This notification goes through via action of the microcode program which transfers the header (control information) of the message through the network buffers. The protocol on the node reads the control header from the network buffer and stores the real addresses of b1... bk in the real address table and this also serves as a notification to the microcode to DMA the data from RDRAM into the memory locations specified in the address table (step 175). The microcode then updates the protocol on the node by indicating that the data is now in the receive buffer and that it is ready to be consumed by the protocol via the network buffer (step 176). The protocol on the receiving side then sends an acknowledgment to the sending side informing it that a1 has now been received. The sending side then advances its flow control window and prepares to send a(k+1) through zero copy mode. The message is thus transported piece wise in a pipelined fashion.

The key point to note as a difference between Method #1 and Method#2 is that the handshake required to ensure that the buffers are prepared and ready to receive data on the receive side is local in Method #2 (that is, it occurs between the node protocol and its adapter microcode), whereas the handshake is across the sending node and the receiving node for Method #1. This is possible in Method #2 because of the availability of memory (RDRAM 117) which allows the zero copy packets to stay in RDRAM without impacting network traffic (i.e. the receiving side can continue to receive packets from the network while it awaits handshake messages from the node protocol indicating where the superpackets in RDRAM are to be DMAed). The adapter microcode processes incoming and outgoing packets while it awaits the handshake information regarding superpackets pending in RDRAM. This allows maximum parallelism in the adapter and helps the adapter realize its full throughput potential. Since the handshake in Method #2 is local on the receive side, it also avoids the extra rendezvous messages employed in Method #1. It should be noted and appreciated that the rendezvous messages are typically very small as compared to the large amounts of data being transferred in zero copy mode. It should also be noted that both algorithms have a cutoff point for message size beyond which the zero copy transfer mode is used. For messages below the cutoff point, the message is staged through the network buffers in the traditional way (for example, the control messages to effect zero copy transport and small messages which are submitted by the user to be sent). The cutoff point is based on node/network parameters like the copy rate on the node, the cost of pinning and mapping buffers, etc.

While the invention has been described in detail herein in accordance with certain preferred embodiments thereof, many modifications and changes therein may be effected by those skilled in the art. Accordingly, it is interded by the appended claims to cover all such modifications and changes falling within the true spirit and scope of the invention.

What is claimed is:

1. A method for sending a message stored in a memory of a first data processing system into a memory of a second data processing system, said method comprising the steps of:

linking, in an adapter connected to said second data processing system, at least one real address, for locations in said memory of said second data processing system, with a unique tag part of which is used to provide an index into a table which is usable to determine real memory locations in the memory of said first data processing system;

communicating said tag to said first data processing system;

transmitting said message, which is in the memory of said first data processing system, and said index to said adapter connected to said second data processing system; and routing said message through said adapter, which is connected to said second data processing system, directly into memory locations in said second data processing system, said memory locations being specified by said real address as determined by said transmitted index.

2. A method for sending a message stored in a memory of a first data processing system into a memory of a second data processing system, said method comprising the steps of:

sending control information to said second data processing system;

in response to the receipt of said control information, pinning real memory locations in said second data processing system which are intended for direct data transfer into said memory locations in said second data processing system;

providing a map within an adapter unit attached to said second data processing system, said map linking said pinned memory locations to a portion of said control information which is usable to identify corresponding pinned real memory locations in said first data processing system;

transmitting from said second data processing system to said first data processing system an indication of readiness for message transmission;

transmitting said message from said first data processing system to said adapter attached to said second data processing system; and transferring said transmitted message from said adapter directly from pinned real memory locations in said first data processing system into said pinned memory locations within the memory of said second data processing system.

3. The method of claim 2 further including the step of transmitting an acknowledgment of receipt of said message to said first data processing system.

4. The method of claim 2 in which said first and second data processing system are nodes in a larger data processing system.

* * * * *